United States Patent [19]

Riede et al.

[11] 4,016,082

[45] Apr. 5, 1977

[54] DEVICE FOR THE DIFFUSION OF SUBSTANCES BETWEEN TWO FLUIDS VIA SEMI-PERMEABLE DIAPHRAGMS

[75] Inventors: Gerhard Riede, Eslov; Gunnar Boberg, Lund, both of Sweden

[73] Assignee: Gambro AG, Baar, Switzerland

[22] Filed: Mar. 24, 1975

[21] Appl. No.: 561,221

[30] Foreign Application Priority Data

Apr. 16, 1974 Sweden .............................. 7405033

[52] U.S. Cl. ........................................... 210/321 B
[51] Int. Cl.² ...................................... B01D 31/00
[58] Field of Search ....................... 210/321, 500 M

[56] References Cited

UNITED STATES PATENTS

| | | | |
|---|---|---|---|
| 3,034,505 | 5/1962 | Sobol | 210/321 X |
| 3,362,540 | 1/1968 | Bluemle, Jr. | 210/321 |
| 3,458,048 | 7/1969 | Swehson | 210/321 |
| 3,616,927 | 11/1971 | Muir | 210/500 M |
| 3,734,298 | 5/1973 | Riede et al. | 210/321 |

Primary Examiner—Frank A. Spear, Jr.
Attorney, Agent, or Firm—Pierce, Scheffler & Parker

[57] ABSTRACT

A device for diffusing substances between two fluids via semi-permeable diaphragms for dialysis apparatus in general and in particular as so-called artificial kidneys. The diaphragms are disposed in pairs between spacer plates and each plate includes an arrangement of flow-through ducts for the respective fluid connected to inlets and outlets respectively. A first fluid is arranged to be ducted between the diaphragms of each pair and a second fluid is arranged to be ducted outside the diaphragms, the diaphragms forming between them a network of ducts for the first fluid. In order to make it possible to prevent such duct networks having a well defined thickness and volume, the diaphragms are joined together by gluing, heat sealing, or the like within a pattern of spots, lines and/or small areas.

6 Claims, 11 Drawing Figures

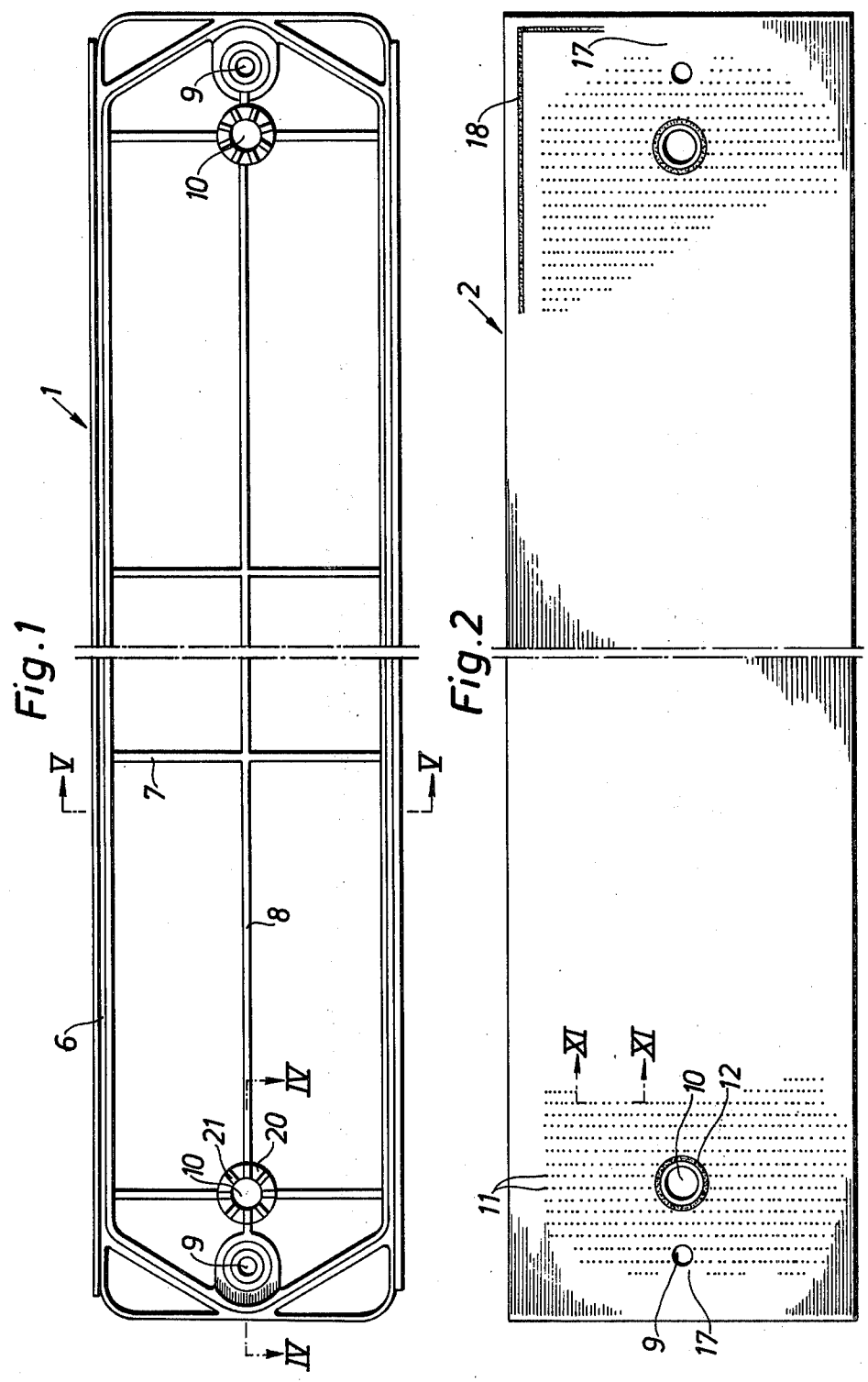

DEVICE FOR THE DIFFUSION OF SUBSTANCES BETWEEN TWO FLUIDS VIA SEMI-PERMEABLE DIAPHRAGMS

The present invention relates to a device for diffusing substances between two fluids via semi-permeable diaphragms which are disposed in pairs between spacing plates in a pile of at least two such plates, each plate comprising throughflow ducts for the respective fluid connected to inlets and outlets, respectively, of which a first fluid is arranged to be ducted between the diaphragms disposed in pairs and a second fluid outside said diaphragms, the diaphragms disposed in pairs forming between them a network of ducts for the said first fluid.

Constructions of the type mentioned above are used for dialysis in general and in particular as so-called artificial kidneys. In previously known constructions and networks of ducts between the diaphragms disposed in pairs have been obtained by compressing the diaphragms in spots or along certain lines within highly well-defined areas. For this purpose relatively complicated spacing plates having a plurality of elevations and ducts disposed therebetween have been used. Examples of such constructions can be found for instance in the Swedish Pat. Nos. 218,441 and 314,167. The purpose of the present invention is to make it possible to provide such networks of ducts having a well-defined thickness and volume, but using much simpler spacing plates than those according to the above-mentioned patents. This is achieved according to the present invention in that the diaphragms are joined together, for instance by gluing, heat sealing or the like within a pattern of spots, lines and/or small areas.

Thus, a device according to the invention is characterized in that said network of ducts has a well-defined thickness and volume as a result of the diaphragms in a pair of diaphragms being joined together by means of gluing, heat sealing or the like within a pattern of spots, lines and/or small areas.

In order to provide a suitable sealing outwardly the pairs of diaphragm should be sealed also along the outer margins of the diaphragm and preferably also around the inlet and outlet for the said second fluid, which is adapted to be ducted outside the diaphragms disposed in pairs.

Alternatively or as a complement to the above mentioned sealing, the margins of the diaphragms can be tightly compressed between spacing plates lying adjacent on both sides, of which at least one will in that case be provided with a circumferential sealing bead, which presses the diaphragm against the second spacing plate.

Preferably the spacing plates according to the present invention are built up from an outer frame carrying within it distribution means for distributing said second fluid to areas between pairs of diaphragms and for leading away the said fluid, said devices together forming throughflow ducts for said second fluid.

Fluid may be supplied to the space between the diaphragms in such a way that at their ends the spacing plates comprise recessed portions with a central through aperture and adapted to receive distribution buttons for the said first fluid disposed between the individual diaphragms in the pairs of diaphragm, said buttons and through apertures together forming throughflow ducts for said first fluid. The said distribution buttons may be constructed for instance in accordance with the Swedish Pat. No. 355,293.

If the device according to the invention would have to be made rigid the spacing plates within the said outer frame can be made rigid by an interior framework of for instance transverse and longitudinal struts intersecting one another.

The invention will be described in greater detail in the following with reference to the accompanying drawings showing a preferred embodiment of the subject matter of the invention.

This device shown as an example is meant to be used as an artificial kidney, the above-mentioned first fluid consisting of blood, while said second fluid consists of a purifying liquid.

Therefore, in the following a so-called artificial kidney will be referred to and reference will be made to these liquids, although it must be obvious to the person skilled in the art that the device according to the invention can also be used for many other purposes.

FIG. 1 is a plan view of a spacing plate comprised in the artificial kidney.

FIG. 2 is a plan view of a pair of diaphragms comprised in the artificial kidney which has been spot welded or spot glued.

Figure 5:
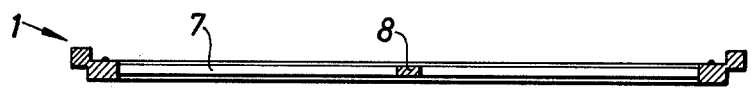

FIG. 5 in the same way shows a section on line V — V in FIG. 1.

Figure 6:
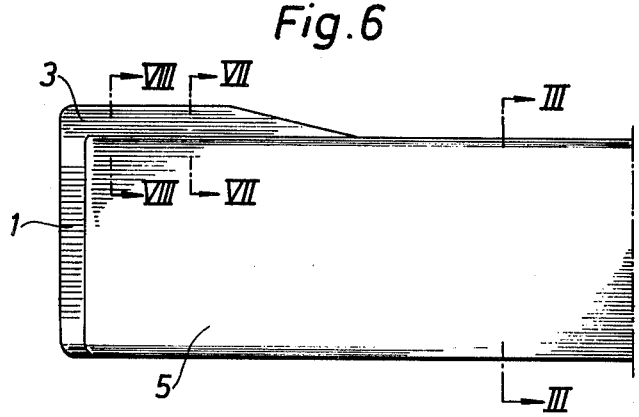

FIG. 6 is a side view of one end of the mounted artificial kidney.

Figure 7:
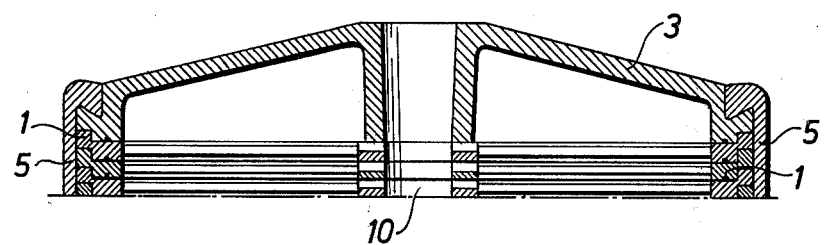
Figure 8:
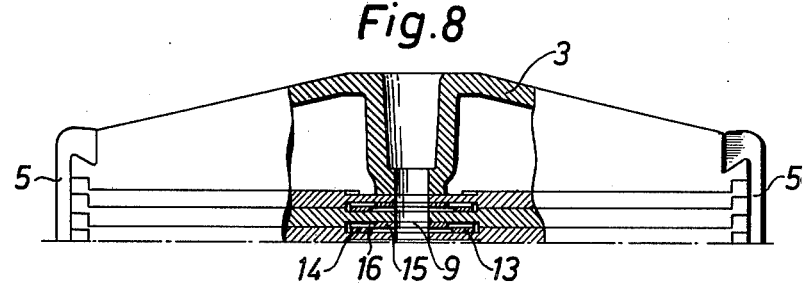

FIGS. 7 and 8 show sections indicated by arrows VII and VIII, respectively, in FIG. 6.

Figure 9:
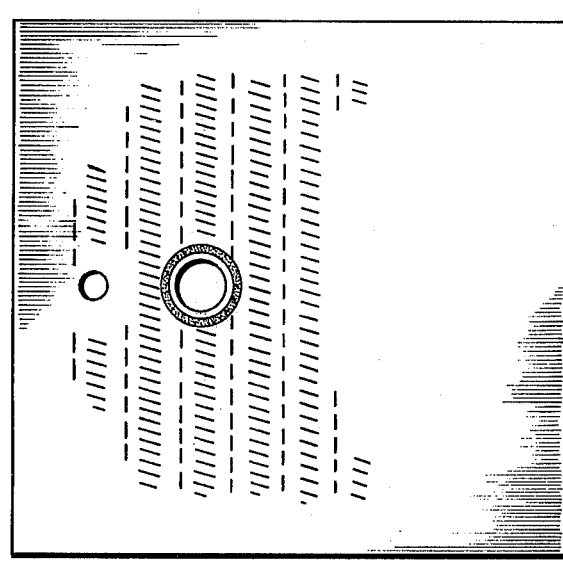
Figure 10:
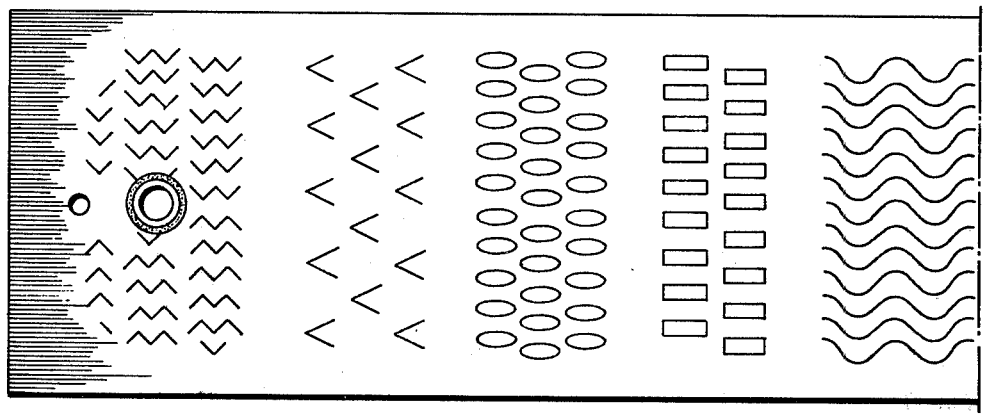

FIGS. 9 and 10 are plan views corresponding to FIG. 2 and are meant to illustrate some different patterns, according to which the diaphragms in the pairs of diaphragms comprised in the artificial kidney can be joined together.

Figure 11:
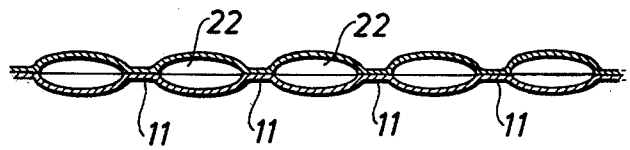

Finally, FIG. 11 shows a section on a highly enlarged scale on line XI — XI in FIG. 2.

The artificial kidney shown as an example comprises bowl-shaped spacing plates 1 which together with a pair of diaphragms 2 are clamped between an upper clamping plate 3 and a lower clamping plate 4. This clamping is effected by means of clamping rails 5, which may for instance be of the kind which is the subject matter of Swedish Pat. No. 342,144.

The spacing plate shown in FIG. 1 is built up from an outer frame 6 having inner transverse struts 7 and longitudinal struts 8. At each end there are inlet and outlet ducts 9, respectively, for blood and inlet and outlet ducts 10, respectively, for purifying liquid (e.g., aqueous salt solution). Between the spacing plates 1 the diaphragms 2 are joined together in pairs, for instance according to the spot pattern shown in FIG. 2, in which the individual spots have been designated 11. In order to prevent the salt solution from the salt distribution duct 10 from entering between the diaphragms and being mixed with the blood, the diaphragms in the respective pairs are also joined together by gluing or welding along an annular seal 12 around the duct 10.

Figure 3:
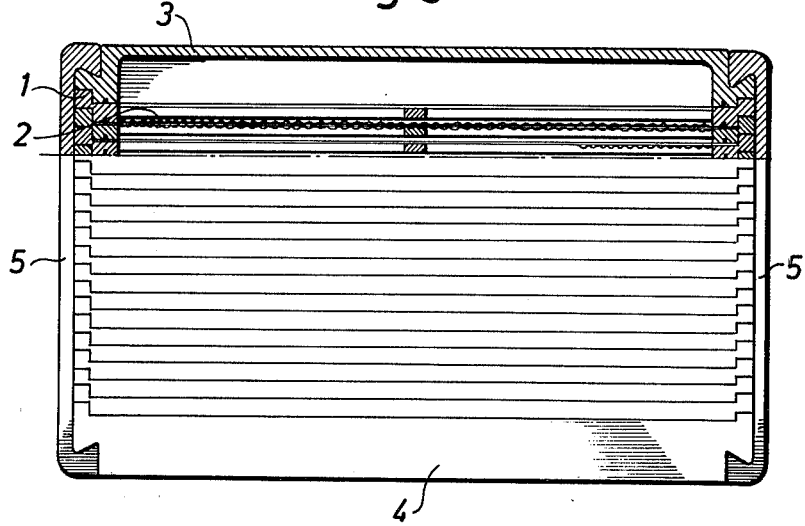
FIG. 3 shows a package of such pairs of diaphragms and spacing plates contained between two squeezing plates and two side rails. The section corresponds to a section III — III in FIG. 6 mentioned below.
Figure 4:
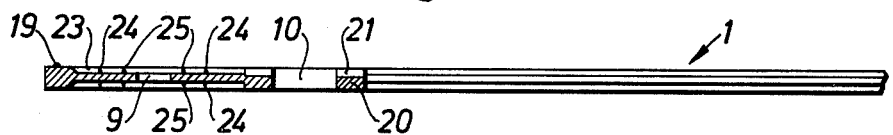
FIG. 4 shows a section on line IV — IV in FIG. 1.

Between the diaphragms 2 blood distributing buttons 13 are placed exactly in front of the blood distribution duct 9, said buttons being shown in greater detail in FIG. 8; they may be for instance of the kind disclosed in Swedish Pat. No. 355,293. The said blood distribution buttons 13 consist of an outer ring 14 and an inner ring 15 being in connection with each other via transverse struts 16. When the device is being assembled they are placed in the recessed portion 23 shown in FIG. 4. The outer ring 14 clamps a diaphragm against a sealing bead 24 on the spacing plate lying below, while the inner ring 15 clamps a second diaphragm against a sealing bead 25 on the spacing plate lying above. As a result, blood is efficiently prevented from penetrating outside the diaphragms.

In order that the blood distribution buttons 13 may be introduced between the diaphragms 2 in a pair of diaphragms the area 17 outside the duct 9 is without spot seals 11. To the right in FIG. 2 it is shown how the pair of diaphragms may be provided with an outer circumferential seal 18 as a supplement to the spot seals 11. If, however, the diaphragms 2 are clamped between the spacing plates by means of the sealing bead 19 shown in FIG. 4, the seal 18 is unnecessary. Alternatively, the seal bead 19 and the seal 18 may supplement each other and provide an additional safety against leakage.

The salt distribution duct 10 in the spacing plate 1 is surrounded by a circular ring 20 of radial struts 21. Alternatively, this saline distribution ring may be made in accordance with the Swedish Pat. No. 355,294.

FIGS. 9 and 10 are intended to illustrate how the spot pattern 11 according to FIG. 2 can be replaced by other patterns giving a somewhat different effect. In FIG. 9 it is shown for instance how the spots have been replaced by longitudinal and transverse linear seals. As a result, the blood is forced to change its direction of movement repeatedly whereby its path through the artificial kidney should become longer.

In FIG. 10 five different patterns are drawn. Of course, it is obvious to the person skilled in the art that the two diaphragms can be joined together according to an unspecified number of other patterns. In some cases it may for instance be suitable to join together both of the diaphragms along longitudinal lines extending only along part of the length of the artificial kidney or along its entire length. However, in the latter case transfer ducts must of course be disposed for the distribution of the blood also to the fringe areas.

Finally, FIG. 11 shows a section on line XI — XI in FIG. 2 on an enlarged scale. From the Figure it is obvious that well-define blood ducts 22 are obtained between the spots 11.

Of course, the invention is not limited to the examples of embodiment described above, but may be varied within the scope of the following claims. For instance, details from the described construction may be replaced by equivalent details from the constructions according to any one of the Swedish Pat. Nos. 218,441, 301,029, 325,370, 314,167, 342,143, 342,144, 355,293, 355,294, and 365,119.

What we claim is:

1. A dialysis apparatus comprising a plurality of stacked plates each having a substantial open area intermediate the sides and ends thereof, pairs of semipermeable membranes disposed between adjacent spacing plates and extending over the open area therein, each spacing plate being disposed alternately between said pairs of membranes, said stack of spacing plates and pairs of membranes being provided with holes therethrough adjacent the ends thereof for forming distributing passages extending transversely of the stack of spacing plates and pairs of membranes for providing an inlet and outlet for a purifying liquid along the outside of each pair of membranes and for providing an inlet and outlet for a liquid to be purified between the membranes of each pair of membranes, the membranes of each pair being sealed together at spaced areas to form tortuous passageways between each pair of membranes at least in those areas corresponding to the open area of said spacing plates, the marginal edges of the holes forming the inlet and outlet for the purifying liquid of each pair of membranes being sealed together for preventing access of the purifying liquid from the distributing passages therefor into the liquid to be purified between the membranes of each pair and means for preventing leakage of the liquid to be purified from the distributing passages therefore into the purifying liquid.

2. Apparatus as claimed in claim 1 wherein the marginal edges of each pair of membranes are sealed together.

3. Apparatus as claimed in claim 1 wherein at least one of the spacing plates adjacent a pair of membranes is provided with a peripheral bead to form a seal between said adjacent spacing plates and the pair of membranes therebetween when the stack of said plates and membranes are clamped together.

4. Apparatus as claimed in claim 1 wherein each of said spacing plates are provided with distribution means surrounding the holes therein forming the inlet and outlet for the purifying liquid along the outside of each pair of membranes.

5. Apparatus as claimed in claim 1 wherein at least one side of each of said spacing plates is provided with recesses surrounding the holes therein forming the inlet and outlet for the liquid to be purified and further comprising distributing button-like means disposed between the membranes of each pair of membranes at the corresponding holes in said pair of membranes and located in the recesses in said spacing plates.

6. Apparatus as claimed in claim 1 wherein each spacing plate is provided with at least one reinforcement strut extending across the open area therein.

* * * * *